United States Patent
Pöyhönen et al.

(10) Patent No.: US 7,741,796 B2
(45) Date of Patent: Jun. 22, 2010

(54) METHOD FOR CONTROLLING BRAKE CHOPPER, BRAKE CHOPPER AND FREQUENCY CONVERTER

(75) Inventors: Simo Pöyhönen, Vantaa (FI); Mikko Hirvonen, Helsinki (FI); Markku Talja, Järvenpää (FI)

(73) Assignee: ABB Oy, Helsinki (FI)

( * ) Notice: Subject to any disclaimer, the term of this patent is extended or adjusted under 35 U.S.C. 154(b) by 318 days.

(21) Appl. No.: 11/822,155

(22) Filed: Jul. 2, 2007

(65) Prior Publication Data

US 2008/0012513 A1  Jan. 17, 2008

(30) Foreign Application Priority Data

Jul. 4, 2006  (FI) .................................. 20065473

(51) Int. Cl.
H02P 3/12 (2006.01)
H02P 3/22 (2006.01)

(52) U.S. Cl. .................. 318/380; 318/508; 318/375; 318/376; 318/368; 323/364; 327/101; 324/677; 340/870.24

(58) Field of Classification Search ............... 318/380, 318/375, 376, 757, 703, 508; 323/364; 327/101; 324/677; 340/870.24
See application file for complete search history.

(56) References Cited

U.S. PATENT DOCUMENTS

| | | | | |
|---|---|---|---|---|
| 3,657,625 A | * | 4/1972 | Miller et al. | 318/370 |
| 3,890,551 A | * | 6/1975 | Plunkett | 318/376 |
| 4,093,900 A | * | 6/1978 | Plunkett | 318/370 |
| 4,256,983 A | * | 3/1981 | Griffith et al. | 327/101 |
| 4,284,936 A | * | 8/1981 | Bailey et al. | 318/381 |
| 4,388,573 A | * | 6/1983 | Horiuchi et al. | 318/376 |
| 4,761,600 A | * | 8/1988 | D'Atre et al. | 318/759 |
| 4,879,639 A | * | 11/1989 | Tsukahara | 363/37 |
| 5,170,105 A | * | 12/1992 | Kumar | 318/362 |
| 5,172,006 A | * | 12/1992 | Suzuki et al. | 290/45 |
| 5,205,741 A | * | 4/1993 | Steen et al. | 439/70 |
| 5,345,294 A | * | 9/1994 | Nomura et al. | 399/90 |
| 5,436,540 A | * | 7/1995 | Kumar | 318/375 |
| 5,629,596 A | * | 5/1997 | Iijima et al. | 318/762 |
| 5,747,959 A | * | 5/1998 | Iijima et al. | 318/762 |
| 7,012,392 B2 | | 3/2006 | Nguyen et al. | |
| 2002/0074804 A1 | | 6/2002 | Gilbreth et al. | |
| 2005/0174081 A1 | | 8/2005 | Nguyen et al. | |

* cited by examiner

*Primary Examiner*—Rita Leykin
(74) *Attorney, Agent, or Firm*—Buchanan Ingersoll & Rooney PC

(57) ABSTRACT

A method for controlling brake resistors and a brake chopper, the number of brake resistors being two or more and the brake resistors being connected in series with switches to be controlled, the series connection being connected between a positive and a negative rail of a DC voltage intermediate circuit, the method comprising the step of determining a magnitude for a voltage of the DC intermediate circuit; and determining a first voltage limit and a second voltage limit. The method further comprises the steps of switching brake resistors to the intermediate circuit in a periodically alternating manner, each switch being switched during a switching period and the on-period of each switch in a switching period being responsive to the magnitude of the voltage in the DC voltage intermediate circuit when the voltage is above the first predetermined limit and below the second predetermined limit.

21 Claims, 4 Drawing Sheets

METHOD FOR CONTROLLING BRAKE CHOPPER, BRAKE CHOPPER AND FREQUENCY CONVERTER

BACKGROUND OF THE INVENTION

The invention relates to controlling a brake chopper and in particular to controlling a brake chopper of a DC voltage intermediate circuit of a frequency converter, and to a brake chopper and a frequency converter provided with one.

Brake choppers are used in the DC voltage intermediate circuits of frequency converters in a prior art manner for preventing an increase in the intermediate circuit voltage and for reducing the voltage when a device that normally fed from the frequency converter exceptionally feeds energy back to the intermediate circuit. This kind of situation arises for example when a magnetized motor rotates uncontrolled and thereby functions as a generator feeding power to the DC voltage intermediate circuit.

The situation is the same when a frequency converter is used for active braking of a rotating motor, whereby the power from the braking is transferred to the intermediate circuit. Drives in which braking is used often are usually equipped with a network braking supply unit that enables power to be transferred from the intermediate circuit through the supply unit into the feeding network. Then again drives in which braking is rather used on an occasional basis are typically provided with brake choppers, because a brake chopper is significantly more affordable to invest in than a network braking supply unit.

There are also cases in which an intermediate circuit of a frequency converter provided with a network braking supply unit nevertheless must be equipped with brake choppers. One example of this is isolated operation, such as the electric system of a vessel, where the braking energy generated in the motor may exceed other consumption in the electric system. In this situation the electric power network cannot be fed with more energy but it has to be removed by using a brake chopper in the intermediate circuit of the frequency converter.

A conventional method used for controlling brake choppers is tolerance band control, in which the intermediate circuit is provided with a predetermined voltage level and when this level is exceeded, a brake resistor is switched into the intermediate circuit through a chopper. The voltage in the intermediate circuit thus starts to decrease at a rate that depends on the braking power, the intermediate circuit capacitance and the resistance of the brake resistor. The resistor is kept switched on until the intermediate circuit voltage drops below the predetermined level, and the voltage starts to rise again.

Braking power can be increased by connecting a plural number of resistors in parallel. These parallel-connected resistors share the same control and therefore they also function simultaneously.

Publication U.S. Pat. No. 7,012,392 discloses a method and an apparatus for controlling a brake chopper. In this solution a plural number of voltage limits are determined for the intermediate circuit voltage. When the intermediate circuit voltage exceeds these limits or drops below them, the number of brake resistors switched on is increased or decreased in a predetermined order. This control method allows a fixed number of braking powers of different magnitudes to be obtained. In addition, it enables to reduce high intermediate circuit currents created in the conventional tolerance band control.

A problem with the above brake chopper is that the number of different braking powers to be obtained is fixed, which occasionally leads to an unnecessarily high braking power.

SUMMARY OF THE INVENTION

It is therefore an object of the invention to provide a method and an apparatus implementing the method to enable the above problems to be solved. This object is achieved by a method and system characterized by what is stated in the independent claims. The preferred embodiments of the invention are disclosed in the dependent claims.

The basic idea of the invention is that the braking power of an intermediate circuit is controlled on the basis of a momentary braking power need by staggering control operations of parallel brake resistors of a brake chopper. The braking power is controlled by extending staggered pulses.

An advantage of the method and system of the invention is that the system adjusts in a simple manner to remove power from an intermediate circuit as need arises. The equipment for implementing the method in the system may consist of switch components or modules containing a plural number of switches used in an inverter unit in a prior manner. In addition, the invention may utilize modulators, known per se in frequency converters, for controlling braking power.

The invention further relates to a frequency converter provided with a brake chopper of the invention.

BRIEF DISCLOSURE OF THE DRAWINGS

In the following the invention will be discussed in greater detail with reference to the preferred embodiments and the accompanying drawings, in which FIG. 1 illustrates brake chopper currents at a braking power of 33%;

DETAILED DISCLOSURE OF THE INVENTION

Figure 6:
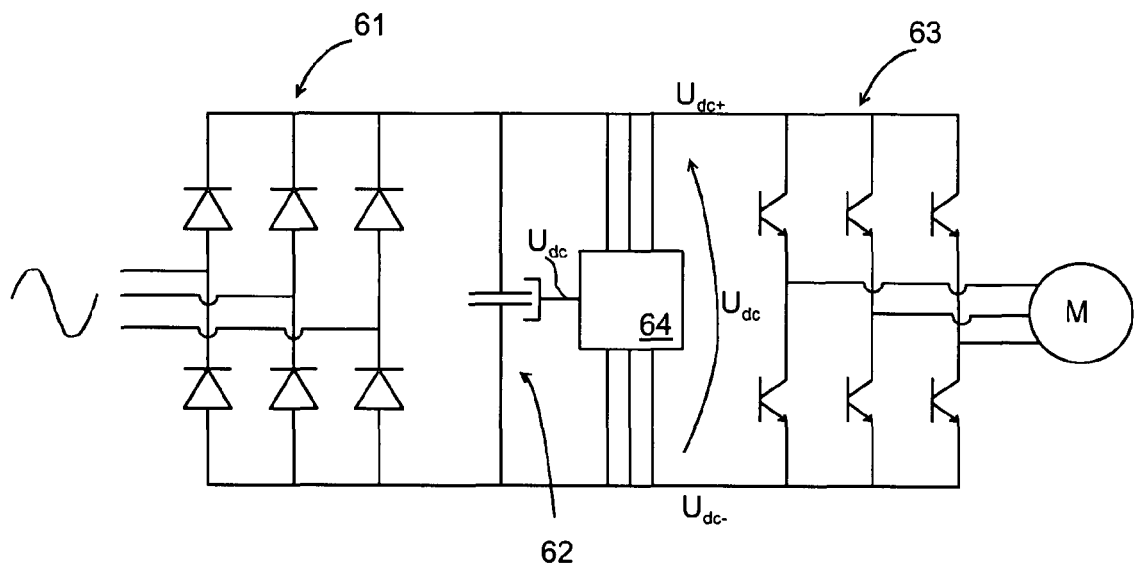
FIG. 6 is a schematic view of a frequency converter and a brake chopper associated therewith.

FIG. 6 is a schematic view of the structure of a frequency converter and a brake chopper associated therewith. The frequency converter consists of a rectifier bridge 61, which in the example of FIG. 6 is a non-controlled diode bridge. The frequency converter is further provided with an intermediate circuit capacitor 62 connected between the positive and negative voltage rails $U_{dc+}$, $U_{dc-}$ of the frequency converter. The frequency converter also has an inverter portion 63 for generating alternating current from the voltage of the voltage intermediate circuit for a load, which in FIG. 6 is represented by a motor M.

FIG. 6 shows a brake chopper 64 connected to the intermediate circuit of the frequency converter for reducing the intermediate circuit voltage $U_{dc}$ when the motor functions regeneratively, i.e. generates voltage into the intermediate circuit. In connection with the brake chopper 64 the figure shows how the brake chopper receives information of the intermediate circuit voltage $U_{dc}$ for its operation and how the brake chopper is connected to both the positive and the negative voltage rail. Frequency converters typically measure the intermediate circuit voltage for controlling a load. In that case the brake chopper does not need a separate voltage measurement such as the one shown in FIG. 6, but the value of the intermediate circuit voltage may be delivered to the brake chopper from the control circuits of the inverter part. In some cases, however, it is justified to arrange an independent measurement of the intermediate circuit voltage to the brake chopper for use and thereby allow the brake chopper to function as an independent unit.

Figure 7:
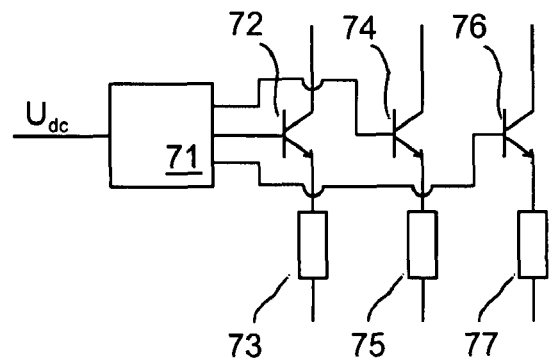
FIG. 7 is a schematic view of a brake chopper.

FIG. 7 shows the structure of the brake chopper 64 in greater detail. As described above, the brake chopper receives as a measurement data the intermediate circuit voltage $U_{dc}$, which is delivered to a member 71 containing a modulator. The member 71 is used for controlling switch components 72, 74, 76 into a conductive mode, whereby resistors 73, 75, 77 in series with the switches are connected to the DC voltage intermediate circuit, more specifically between the positive and negative rails thereof. The brake resistors are activated when voltage in the intermediate circuit rises above a predetermined first limit $U_{lim1}$.

According to the method of the invention, brake resistors are connected to the intermediate circuit in a periodically alternating manner. In general, periodic control means that switching takes place within a predefined switching period. A switching period thus contains an active switching period, during which the switch is in a conductive mode, and a non-active period, during which the switch is in a non-conductive mode.

Further, according to the method each switch is switched during a switching period, the on-period of each switch in a switching period being responsive to the magnitude of the voltage in a DC voltage intermediate circuit, when the voltage is above a predetermined first limit. Then again, when the intermediate circuit voltage drops below the first limit, the control of the brake resistor switches is discontinued and current no longer passes through the resistors.

On the other hand, if the voltage rises above a predetermined second limit $U_{lim2}$, the brake resistors are kept continuously connected to the intermediate circuit. When the intermediate circuit voltage drops below the second voltage limit but remains above the first limit, the switches are controlled in the manner disclosed in the invention.

The member in FIG. 7 is thus provided with the predetermined first voltage limit $U_{lim1}$ that decides the moment when the control of the switches starts on the basis of the intermediate circuit voltage. The predetermined second voltage limit $U_{lim2}$ then determines on the basis of the intermediate voltage the moment when the braking power is at its maximum and all parallel braking resistors are connected to the intermediate circuit. The voltage limits may be fixedly set into the member 71, or in such a way that the magnitude of the limit voltages can be changed.

Figure 9:
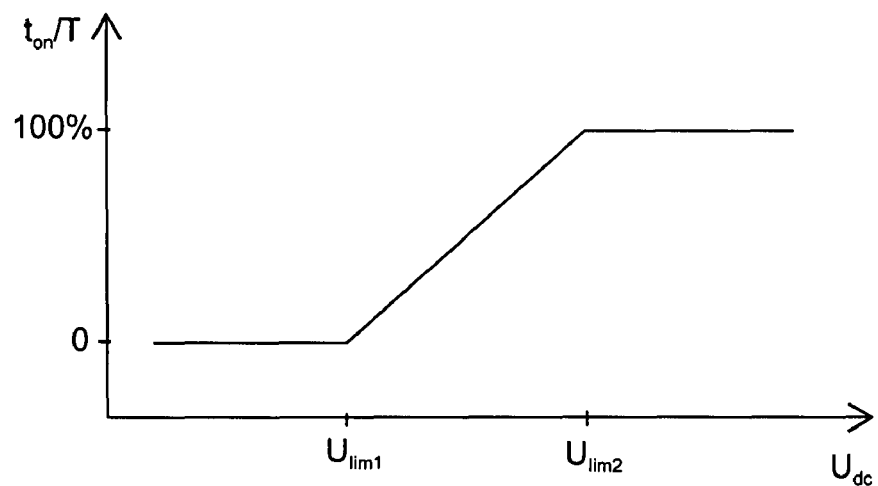
FIG. 9 illustrates the on-period of switches of an embodiment of the invention in relation to an intermediate circuit voltage.

FIG. 9 illustrates the ratio $t_{on}/T$ of the on-period $t_{on}$ of each switch to the switching period time as a function of the intermediate circuit voltage $U_{dc}$ in an operation according to a preferred embodiment of the invention. As shown in FIG. 9, when the intermediate voltage rises to the value $U_{lim1}$, the control of the switches starts. As the voltage rises further, the ratio $t_{on}/T$ increases until the intermediate circuit voltage reaches the value $U_{lim2}$. According to the preferred embodiment of the invention, at that point the modulation of the switches is stopped and they are left in a conductive mode. The limit voltages $U_{lim1}$ and $U_{lim2}$ may be determined directly as absolute values, i.e. so that their magnitude is greater than the intermediate circuit voltage, as in the example of FIG. 9. The limit voltages may also be determined in relation to the magnitude of the intermediate circuit voltage, the limit voltages in this case indicating the magnitude of the limits in relation to the positive rail of the intermediate circuit. Although in the example of FIG. 9 the braking power increases linearly as the intermediate circuit voltage rises, this is not necessarily required.

With the switching instructions formulated as described above in such a way that the parallel brake resistors are all controlled during a switching period in a substantially the same way and in a staggered manner, a pulse width modulated control of brake resistors is achieved. The switching pulses may be staggered for example by staggering evenly the switching periods of the control of all the parallel brake resistors. For example, if the brake chopper is provided with three parallel branches, the time between switching periods is arrived at by dividing a switching period time by three. Depending on the number n of the parallel branches in general, the time delay thus obtained between parallel branches will be T/n, where T represents the switching period time.

Figure 8:
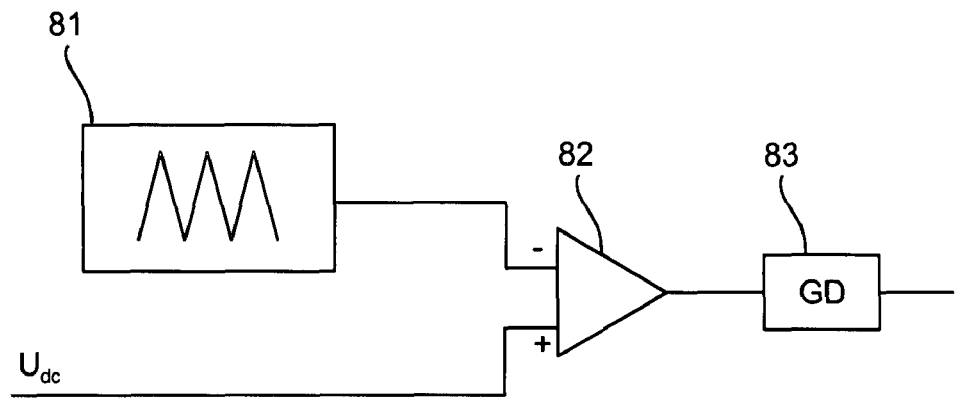
FIG. 8 illustrates a switching instruction formulated according to an embodiment of the invention for a brake chopper.

FIG. 8 shows in greater detail an example of the configuration of one parallel brake chopper branch of the member 71 including a modulator implementing the method of the invention. In the embodiment of FIG. 8 a triangular wave 81 is formed, the lowest points of the wave amplitude corresponding to the first voltage limit $U_{lim1}$ and highest points to the second voltage limit $U_{lim2}$. The triangular wave is compared to the intermediate circuit voltage $U_{dc}$ in a comparator 82, the comparator output being further connected to a gate controller 83, which in turn controls a switch component connected to the branch in question. When the triangular wave has an instantaneous value lower than the intermediate circuit voltage, the comparator 82 controls the switch to a conductive mode by means of the gate controller.

As mentioned above, FIG. 8 illustrates an embodiment relating to one parallel branch of the brake chopper of the invention for a staggered control of a switch in relation to the switches of other branches. In order to achieve the staggering between the branches, the triangular waves of the different branches are phase-shifted with respect to each other. The number of the parallel resistors determines the amount of the phase shift so that the formed triangular waves are evenly distributed with respect to each other. A triangular wave may have a frequency in the order of 500 to 1000 Hz, for example, the switching period time T thus being 1 to 2 ms.

In the above manner the brake chopper is controlled by means of pulse width modulation. The width of the pulses is changed according to the magnitude of the intermediate circuit voltage. Moreover, in FIG. 8 the pulse-width modulation is carried out using a pulse width modulator based on a level/triangle comparison. When this embodiment is applied, the switch control starts automatically when the voltage increases, and when the intermediate circuit voltage reaches the second limit voltage $U_{lim2}$, the switches are in a continuously conducting mode and braking power is at its maximum. In an operation within these limits, the braking power of the brake chopper adjusts in a simple manner and the switch components are automatically loaded evenly, without sequence tables dependent on the braking power.

According to a preferred embodiment the brake resistors are provided as brake chopper groups. Such a group has series connections of a brake resistor and a switch component to be controlled. Each component to be controlled in one brake chopper group receives switching instructions from the same control circuit, such as the modulator described above. Thus, despite an eventual malfunction in a brake resistor unit of one brake chopper group, braking may be continued at a reduced power.

FIGS. 1, 2, 3 and 4 schematically illustrate diagrammatic patterns of currents of a brake chopper of the invention and diagrammatic patterns of a prior art point-to-point control. The figures relate to the use of a brake chopper of the invention provided with three parallel resistor branches. The currents of these three resistors have been scaled by coefficients in order to separate them from one another. The current in branch A has been multiplied by coefficient 0.9, the current in branch B by 0.8 and the current in branch C by 0.7. Curve A+B+C represents the sum of the currents of these branches, which is the current of the intermediate voltage circuit. Curve E, in turn, shows the current of a chopper implemented by means of tolerance band control, i.e. it represents the simultaneous switching of all the three parallel resistors. FIGS. 1, 2, 3 and 4 show how the chopper control according to the method of the invention produces a significantly more even current in the intermediate voltage circuit, thereby causing less ripple and interference. The control method of the invention allows lower currents to be switched at a time, whereby the intermediate circuit capacitor is subjected to less strain and, at the same time, resonance excitation is reduced. FIGS. 1, 2, 3 and 4 are scaled in such a way that current magnitude 1 corresponds to the maximum current of one chopper branch.

FIGS. 1, 2, 3 and 4 further illustrate the principle of the invention according to which the switches are controlled alternately and in such a way that the control operations and the current pulses are staggered.

Figure 1:
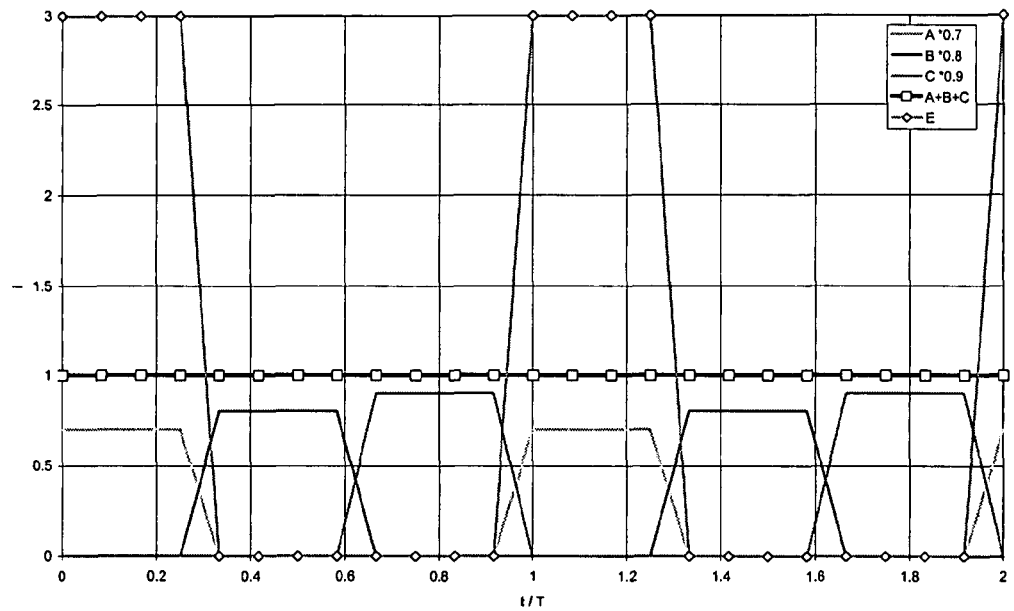
Figure 2:
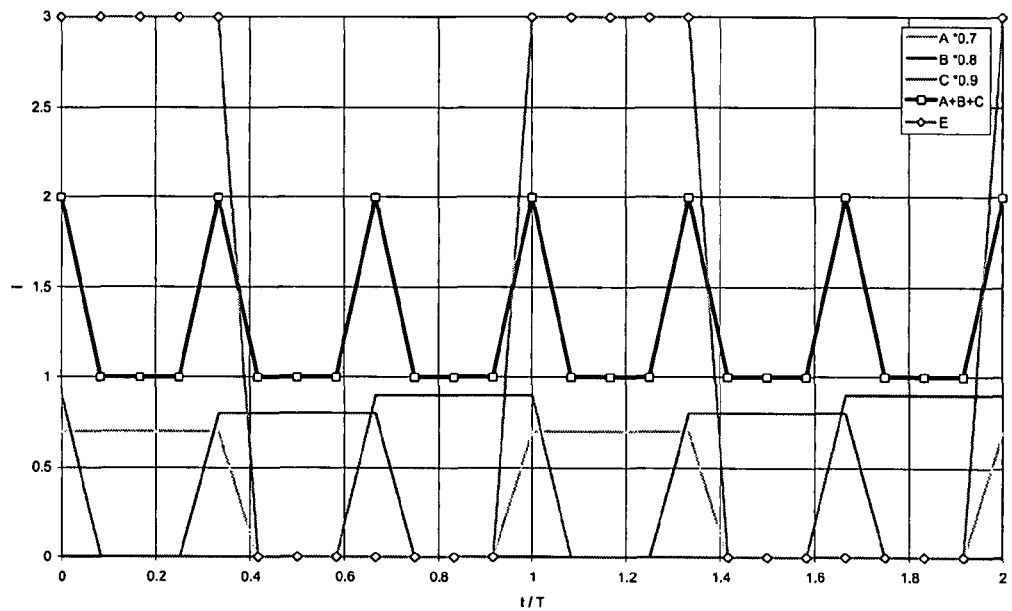
FIG. 2 illustrates brake chopper currents at a braking power of 42%.
Figure 3:
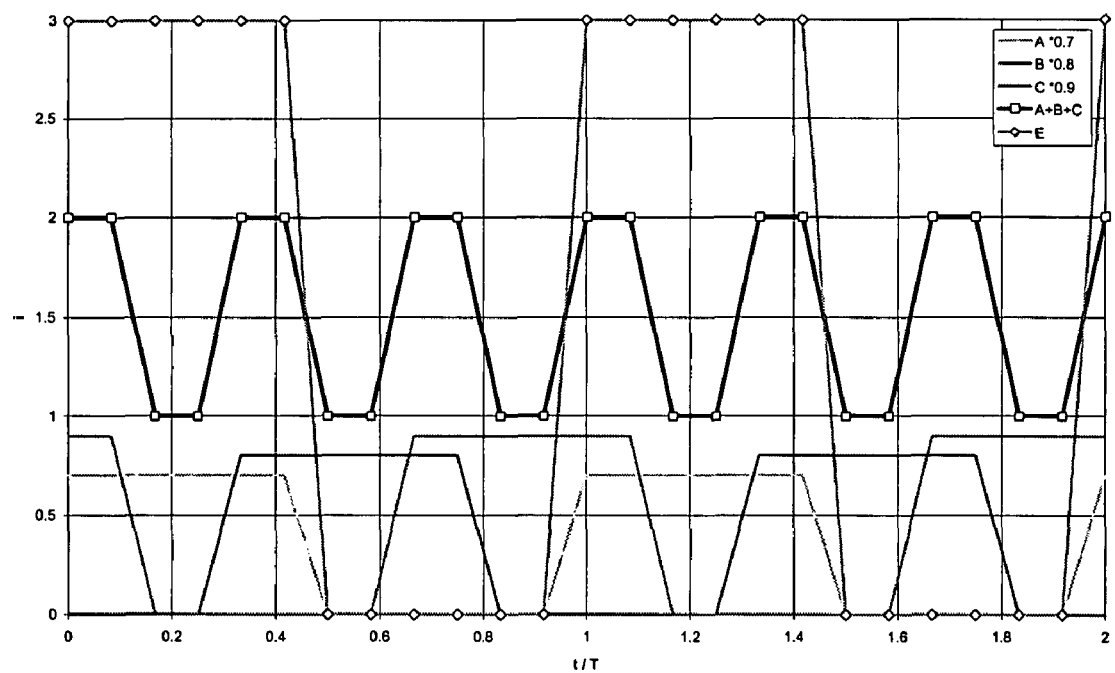
FIG. 3 illustrates brake chopper currents at a braking power of 50%.
Figure 4:
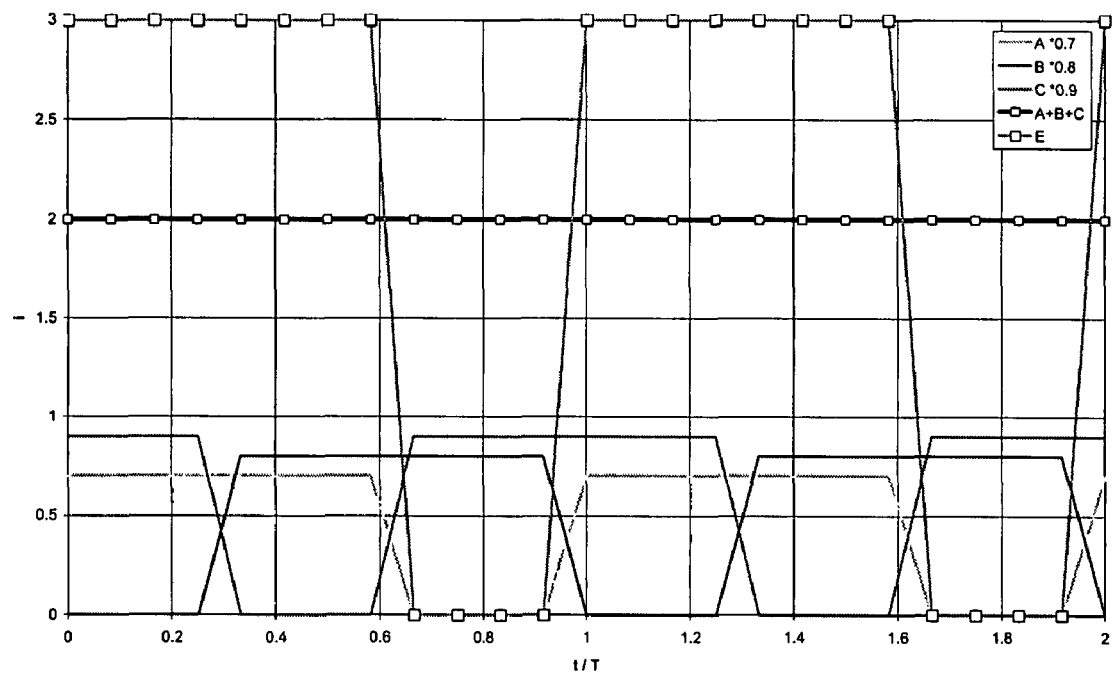
FIG. 4 illustrates brake chopper currents at a braking power of 67%.
Figure 5:
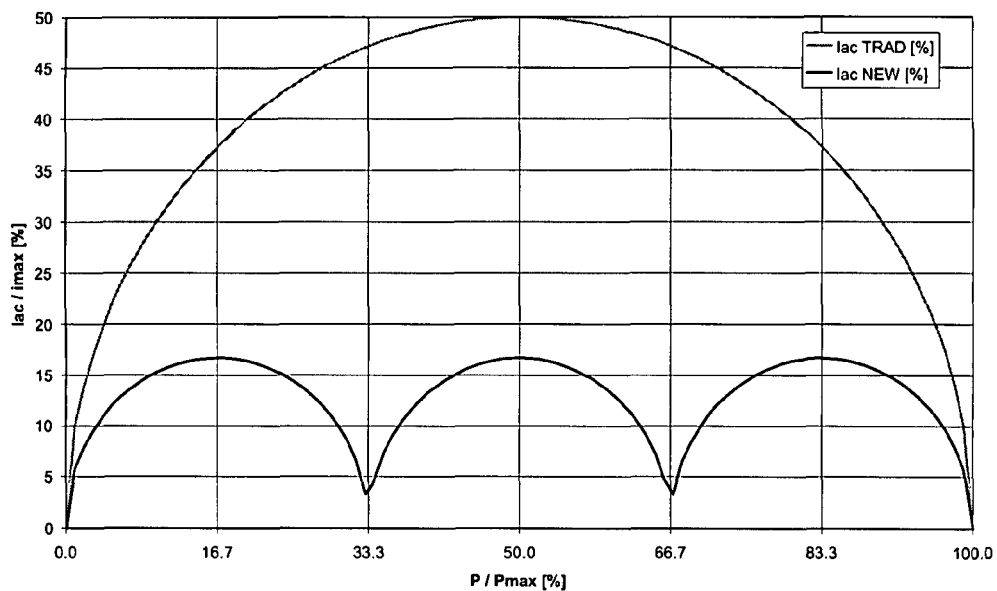
FIG. 5 illustrates an AC component on the DC side of a frequency converter as a function of braking power.

FIG. 5 shows an AC component visible on the DC side as a function of the braking power. In the prior art (TRAD) the three switches are controlled simultaneously, whereas in the operation according to the invention (NEW) the current pulses are staggered. As shown by the curve, in the implementation according to the invention the maximum value of the AC component in the intermediate circuit is a third of the maximum value in the conventional control method. Generally speaking, the maximum value is inversely proportional to the number of separately controlled choppers, which in the case of FIG. 5 is three, as already stated.

It is to be noted that the curves of the figures referred to above represent an ideal situation. In reality, the intermediate circuit contains oscillations that increase nominal values. Moreover, nonidealities in the measurement and in the control further increase the nominal values.

The method of the invention is disclosed above with a specific reference to an implementation involving a level/triangle modulator. However, it is obvious that there are also other pulse width modulation methods, known per se, that may be applied in connection with the invention. One possibility is to use a direct torque control (DTC) modulator, for example.

A person skilled in the art will find it obvious that as technology advances the basic idea of the invention may be implemented in various ways. Therefore the invention and its embodiments are not restricted to the above examples but may vary within the scope of the claims.

The invention claimed is:

1. A method for controlling at least two brake resistors, each being connected in series with a respective one of a plurality of switches to be controlled, each of the at least two brake resistors and the respective one of the switches being connected between a positive and a negative rail of a direct current (DC) intermediate circuit, the method comprising:
   determining a magnitude of a voltage of a DC intermediate circuit in relation to a first voltage limit and a second voltage limit; and
   switching the brake resistors to the DC intermediate circuit in a periodically alternating manner by alternately switching each switch, during a switching period, between a respective off-period and an on-period of each switch when the magnitude of the voltage of the DC intermediate circuit is determined to be above the first voltage limit and below the second voltage limit,
   wherein the length of the respective on-period of each switch is based on the determined magnitude of the voltage of the DC intermediate circuit.

2. A method according to claim 1, wherein the method further comprises keeping the brake resistors continuously connected to the DC intermediate circuit, when the magnitude of the voltage of the DC intermediate circuit is above the second limit.

3. A method according to claim 1, wherein the periodical switching of the brake resistors to the DC intermediate circuit comprises switching the brake resistors at substantially even intervals in relation to each other.

4. A method according to claim 1, wherein the periodical switching of the brake resistors is staggered such that an interval between the switching of different brake resistors is based on the length of the switching period and the number of the brake resistors.

5. A method according to claim 1, wherein the switching of the brake resistors to the DC intermediate circuit comprises:
   generating a triangular wave for each brake resistor, respectively, each wave vibrating between the first voltage limit and the second voltage limit and being temporally staggered in relation to each other for a time period equal to a quotient obtained by dividing the length of a triangular wave period by the number of the brake resistors;
   comparing each triangular wave to the determined magnitude of the voltage of the DC intermediate circuit;
   switching each brake resistor to the DC intermediate circuit by turning on the respective switch when the instantaneous value of a corresponding triangular wave is smaller than the determined voltage of the DC intermediate circuit; and
   switching off each brake resistor by turning off the respective switch when the instantaneous value of a corresponding triangular wave is greater than the determined voltage of the DC intermediate circuit.

6. A method according to claim 1, wherein the on-period of each switch is changed substantially linearly in response to a change in the magnitude of the voltage of the DC intermediate circuit when the magnitude of the voltage of the DC intermediate circuit is determined to be between the first limit and the second limit.

7. A brake chopper comprising:
   controllable switches;
   two or more brake resistors, the brake resistors being connected in series with the switches to be controlled, each of the brake resistors and the respective one of the switches being connected between a positive and a negative rail of a direct current (DC) voltage intermediate circuit;

means for determining a magnitude of the voltage of the DC voltage intermediate circuit in relation to a first voltage limit and a second voltage limit; and means for switching the brake resistors to the DC voltage intermediate circuit in a periodically alternating manner by alternately switching each switch, during a switching period, between a respective off-period and an on-period of each switch when the magnitude of the voltage of the DC intermediate circuit is determined to be above the first voltage limit and below the second voltage limit, wherein the length of the respective on-period of each switch is based on the determined magnitude of the voltage of the DC intermediate circuit.

8. A brake chopper according to claim 7, wherein the means for switching the brake resistors is configured to keep the brake resistors constantly connected to the intermediate circuit, when the intermediate circuit voltage is above the second predetermined limit.

9. A brake chopper according to claim 7, wherein the means for switching the brake resistors comprise a modulator configured to compare the intermediate circuit voltage with a triangular wave between the voltage limits and to switch the switches on the basis of the comparison.

10. A brake chopper according to claim 7, wherein at least some of the brake resistors are arranged in brake chopper groups, each group including two or more brake resistors with corresponding ones of the controllable switches, wherein the means for switching controls each switch in at least one brake chopper group identically.

11. A method according to claim 1, wherein the DC intermediate circuit is a DC intermediate circuit of a frequency converter.

12. A method according to claim 1, comprising determining the first voltage limit and the second voltage limit before the step of switching brake resistors.

13. A brake chopper for a DC intermediate circuit, the brake chopper comprising:

controllable switches;

brake resistors being respectively connected in series with a corresponding one of the controllable switches; and a switch controller configured to determine a voltage of the DC intermediate circuit in relation to a first voltage limit and a second voltage limit, and to switch the brake resistors to the DC intermediate circuit in a periodically alternating manner by alternately switching each switch, during a switching period, between a respective off-period and an on-period of each switch when the magnitude of the voltage of the DC intermediate circuit is determined to be above the first voltage limit and below the second voltage limit, wherein the length of the respective on-period of each switch is based on the determined magnitude of the voltage of the DC intermediate circuit.

14. A brake chopper according to claim 13, wherein the switch controller is configured to keep the brake resistors constantly connected to the DC intermediate circuit when the magnitude of the voltage of the DC voltage intermediate circuit is above the second predetermined limit.

15. A brake chopper according to claim 13, wherein at least some of the brake resistors are arranged in brake chopper groups, each group including two or more brake resistors with corresponding ones of the controllable switches, wherein the means for switching controls each switch in at least one brake chopper group identically.

16. A brake chopper according to claim 13, wherein the switch controller comprises a modulator configured to compare the intermediate circuit voltage with a wave between the first voltage limit and the second voltage limit and to switch the switches based on the comparison.

17. A brake chopper according to claim 15, wherein the switch controller comprises a wave generator configured to generate the wave.

18. A brake chopper according to claim 17, wherein the wave generated by the wave generator comprises a triangle wave.

19. A brake chopper according to claim 13, wherein the on-period of each switch is changed substantially linearly in response to a change in the magnitude of the voltage of the DC intermediate circuit when the magnitude of the voltage of the DC intermediate circuit is determined to be between the first limit and the second limit.

20. A brake chopper according to claim 13, wherein the periodical switching of the brake resistors is staggered such that an interval between the switching of different brake resistors is based on the length of the switching period and the number of the brake resistors.

21. A frequency converter comprising:

a DC voltage intermediate circuit; and a brake chopper including:

controllable switches;

brake resistors being respectively connected in series with a corresponding one of the controllable switches, each of the brake resistors and the respective one of the switches being connected between a positive and a negative rail of a direct current (DC) voltage intermediate circuit; and a switch controller configured to determine a voltage of the DC intermediate circuit in relation to a first voltage limit and a second voltage limit, and to switch the brake resistors to the DC intermediate circuit in a periodically alternating manner by alternately switching each switch, during a switching period, between a respective off-period and an on-period of each switch when the magnitude of the voltage of the DC intermediate circuit is determined to be above the first voltage limit and below the second voltage limit, wherein the length of the respective on-period of each switch is based on the determined magnitude of the voltage of the DC intermediate circuit.

* * * * *